(12) United States Patent
Youells et al.

(10) Patent No.: US 6,829,935 B1
(45) Date of Patent: Dec. 14, 2004

(54) DRIVE LOCATION COMPENSATION SYSTEM

(75) Inventors: James P. Youells, Linden, MI (US); Scott B. Holland, Shelby Township, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/452,703

(22) Filed: Jun. 2, 2003

(51) Int. Cl.[7] ............................................. B01M 1/16
(52) U.S. Cl. ........................... 73/462; 73/1.84; 73/460
(58) Field of Search ........................... 73/1.84, 66, 460, 73/462, 471, 473, 487

(56) References Cited

U.S. PATENT DOCUMENTS

| | | | |
|---|---|---|---|
| 3,232,118 A | 2/1966 | Hack | |
| 4,085,619 A | * 4/1978 | Shapiro et al. | ............... 73/462 |
| 4,464,934 A | 8/1984 | Giers | |
| 4,646,570 A | 3/1987 | Schoenfeld | |
| 4,852,405 A | 8/1989 | Schonfeld | |
| 6,067,857 A | * 5/2000 | Cooper et al. | ............... 73/462 |
| 6,098,022 A | * 8/2000 | Sonnichsen et al. | ......... 702/35 |
| 6,595,052 B2 | * 7/2003 | Wharton | ...................... 73/460 |
| 6,631,640 B2 | * 10/2003 | Miura | ........................ 73/462 |
| 2003/0213302 A1 | * 11/2003 | Miura | ........................ 73/462 |

* cited by examiner

Primary Examiner—Hezron Williams
Assistant Examiner—John C Hanley

(57) ABSTRACT

A drive location compensation system determines a deviation between an actual and nominal position of a drive location on a rotor relative to an attachment location on the rotor. The compensation system uses a balancing machine and a sensor that detects when one of the attachment locations passes a known position. Based on the output of the sensor and a known position of a drive spindle of the balancing machine that is coupled to the drive location on the rotor, a relation between the drive spindle and the attachment location is determined. This relationship is compared to a nominal relationship that is based on a calibration standard. The deviation is compensated for during the balancing or the rotor.

23 Claims, 3 Drawing Sheets

DRIVE LOCATION COMPENSATION SYSTEM

FIELD OF THE INVENTION

The present invention relates to the balancing of rotors and more particularly to the balancing of rotors that are driven by a drive location on the rotor and that may, or may not, use a mechanical compensation during the balancing operation to compensate for mass(es) later attached to the rotor.

BACKGROUND OF THE INVENTION

When rotors, such as crankshafts, are being fabricated, it is desirable that they be rotationally balanced so that minimal vibration will occur when the rotor is installed in its intended machine. This balancing operation commonly involves rotating the rotor to determine where there is excessive mass on the rotor which may cause vibration, and then using a drilling operation to remove mass from the appropriate region of the rotor so that the rotor is rotationally balanced.

Because some types of rotors have portions (attachment locations) that are ultimately connected to other components possessing mass, such as pistons and connecting rods that are ultimately connected to the crankpins of a crankshaft, it is necessary for some styles of rotors (for example crankshafts for a single cylinder engine, some 2, 3 and 5 cylinder engines, and for most "V" type engines) that the mass of these additional components be considered when the rotor is being balanced, such as by the use of a mechanical couple. The normal method for such couple compensation uses weights on opposite ends of a drive spindle and creates a couple that is a force down on one end of the drive spindle and a force up on the other end of the drive spindle. The couple mimics the influence of the mass of the other components while the rotor is being balanced. The rotor is aligned relative to the drive spindle so that these two couples are subtractive. This results in a free body system that has virtually no vibration for a properly balanced rotor. This virtual zero vibration greatly enhances the balance machine's ability to achieve high accuracy in the process, as is well known in the art.

To properly balance a rotor, the position of the attachment locations on the rotor relative to the drive spindle must be known within a specific tolerance. For example, to properly balance a crankshaft, the position of the crankpins on the crankshaft relative to the drive spindle must be known within a specific tolerance. Previous manufacturing techniques for producing crankshafts resulted in large deviations in the positions of the individual crankpins of the crankshaft relative to one another. These positional deviations were sometimes previously required to be taken into account when balancing some crankshafts, see for example U.S. Pat. No. 4,646,570. However, in most modem production techniques for producing crankshafts, the positional accuracy of one crankpin relative to the next crankpin is within a small enough tolerance that positional deviations of the crankpins from a nominal position are no longer required to be compensated for during the balancing process. That is, the positional accuracy between the crankpins is small enough such that the deviations between these actual positions and nominal positions are usually inconsequential to the balancing of the crankshaft. Thus, if the position of one crankpin relative to the drive spindle is ascertained, the position of all the crankpins relative to the drive spindle are adequately known.

Balancing machines may drive a rotor from different locations on the rotor. The drive location or drive point on the rotor that is in contact with the driving component of the balancing machine provides a positional relationship between the drive spindle and the rotor that is used to determine the positional relationship between the drive spindle and the attachment location(s) on the rotor. For example, some balancing machines utilize a drive hole (drive location), which may be a manufacturing hole, in a flange on the end of a crankshaft to align the drive spindle with the crankshaft. (Other cranks may come to the balancing machine with a dowel pin in the drive hole. Others still use a key or keyway in the crankshaft as the drive location. Still other machines might use a manufacturing pad as the drive location to drive the crankshaft.) That is, in this example, one end of the drive spindle has a drive pin that is received in the drive hole on the end of the crankshaft to align the drive spindle relative to the crankshaft. The location where the drive pin pushes against the inside of the drive hole on the end of the crankshaft provides a positional relationship between the drive spindle and the crankshaft that is used to determine the positional relationship between the crankpins and the drive spindle. Specifically, the positional relationship between this drive location and any one of the crankpins provides a positional relationship between this drive location and all of the crankpins and is used to determine the positional relationship between the drive spindle and all of the crankpins.

Thus, the position of the drive location on a rotor relative to any one of the attachment locations must be known to within a specified tolerance to properly balance the rotor. The position of the drive location relative to the attachment locations, however, may deviate between rotors and this deviation may need to be compensated for during the balancing operation. For example, in a crankshaft the position of the drive location relative to the crankpins may deviate between crankshafts, due to any combination of drive hole location, size and shape errors, to an extent that would result in improper balancing of the crankshaft if the deviation is not compensated for. Accordingly, it is advantageous to account for deviations in the actual position of the drive location relative to a nominal position of the drive location when balancing a rotor. It is also advantageous to account for such deviations during the actual balancing process as the rotor is spinning to reduce cycle time and associated manufacturing costs.

SUMMARY OF THE INVENTION

The present invention provides a drive location compensation system that compensates for a deviation between the actual position of the drive location relative to a nominal position of the drive location when balancing a rotor, such as a crankshaft. The system provides such compensation during the balancing operation of the rotor so that such compensation has a minimal effect on the cycle time of balancing a rotor.

A system for balancing a rotor having a drive location and at least one attachment location to which component(s) possessing mass are later attached, according to the principles of the present invention is disclosed. The system includes a balancing machine operable to balance the rotor. The balancing machine includes a spindle operable to couple to the drive location on the rotor being balanced. The spindle rotates the rotor during the balancing operation. There is also an attachment location sensor operable to sense a position of the attachment location on the rotor being balanced. A deviation between a nominal position of the drive location and an actual position of the drive location on the rotor relative to the attachment location on the rotor is compensated for during the balancing of the rotor.

A method of balancing a rotor having a drive location and at least one attachment location to which component(s) possessing mass are later attached is also disclosed. The method includes: (1) determining a deviation in a relationship between the drive location on the rotor and the attachment location on the rotor; and (2) compensating for the deviation when balancing the rotor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
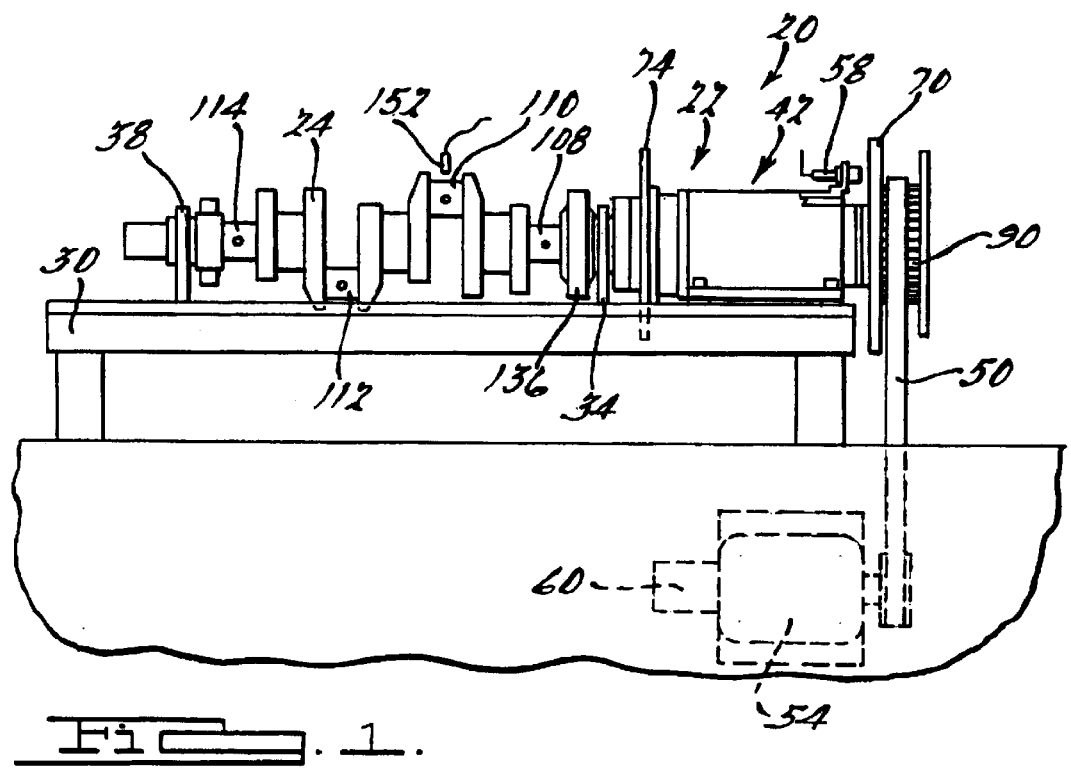
FIG. 1 is a side elevation view of a drive location compensation system according to the principles of the present invention wherein the rotor is a crankshaft.

Referring to FIG. 1, there is shown a drive location compensation system 20 according to the principles of the present invention. Compensation system 20 is shown with a balancing machine 22 that is balancing a rotor 24, in this case in the form of a crankshaft, positioned on balancing machine 22.

Balancing machine 22 includes a frame 30 that isolates balancing machine 22 and compensation system 20 from interference by extraneous vibrations in the environment in which compensation system 20 is employed. There are a pair of supports 34 and 38 on which crankshaft 24 is supported. A drive spindle 42 is positioned on one end of frame 30 and is aligned with and coupled to crankshaft 24. Drive spindle 42 is rotated about spindle axis 46 by a drive belt 50 that is connected to and driven by a motor 54. Rotation of drive spindle 42 also causes crankshaft 24 to rotate, as described below. A spindle sensor 58 is located on balancing machine 22 and is connected to a microprocessor 64. Spindle sensor 58 is operable to indicate when drive spindle 42 is at a specific position in its rotation. Spindle sensor 58 can take a variety of forms, as is known in the art. For example, spindle sensor 58 can be a digital proximity sensor such as a Turck Model No: Ni2-G08-AN7X. An encoder 60 is coupled to motor 54 and connected to microprocessor 64. Encoder 60 provides an angular position of drive spindle 42. Encoder 60 can be integral to motor 54. For example, motor 54 can be a digital servo motor with an integral high resolution encoder. Encoder 60 in conjunction with spindle sensor 58 allows determination of the position of the driving feature/component on spindle 42 that is used to drive crankshaft 24. There are one or more vibration sensors (not shown) on balance machine 22 that measure vibration in the rotating system. The vibration sensors are connected to microprocessor 64 which processes the signals provided by the vibration sensors to determine the unbalance in crankshaft 24 and the required correction to balance crankshaft 24, as known in the art.

Figure 2:
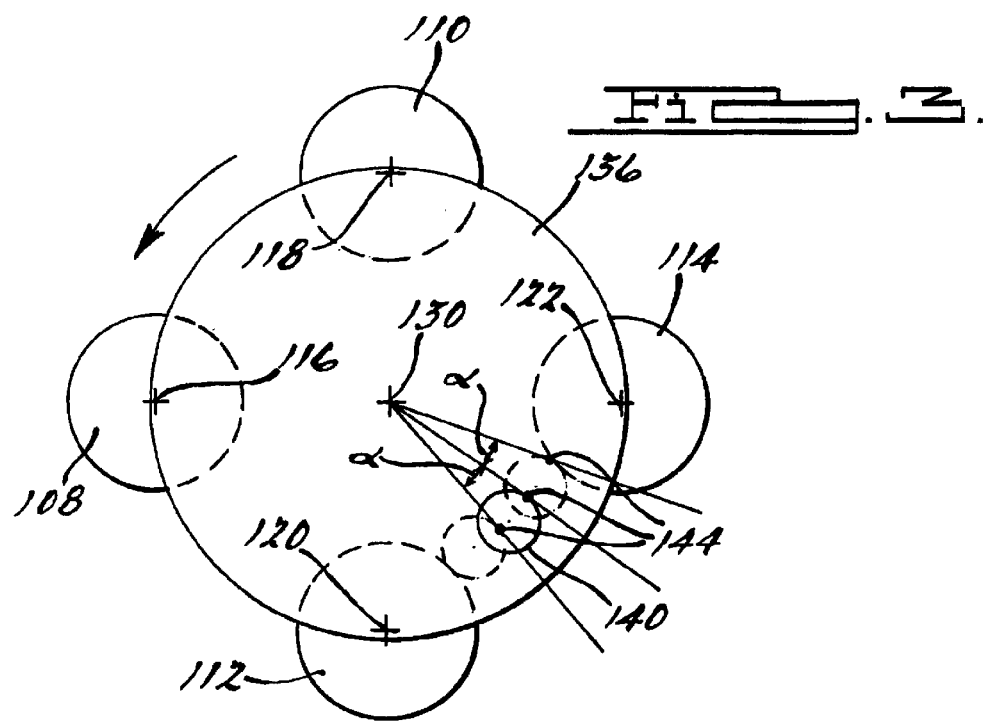
FIG. 2 is a simplified exploded view of a portion of the drive location compensation system of FIG. 1.

Referring now to FIG. 2, drive spindle 42 is shown in greater detail with a majority of the components of balancing machine 22 removed. Drive spindle 42 has opposite first and second ends 66 and 68 with first and second dial plates 70 and 74 that are positioned on or adjacent to the respective first and second ends 66 and 68. Dial plates 70 and 74 have attachment points spaced about the plates that allow compensating weights 80 to be attached to dial plates 70 and 74 to create a mechanical compensation couple to compensate for the mass of components that are later attached to crankshaft 24. Drive spindle 42 has a drive pin 86 that is positioned on second end 68 of drive spindle 42. Drive pin 86 engages with crankshaft 24 to align drive spindle 42 with and to drive rotation of crankshaft 24. Drive pin 86 is located at a precise position on drive spindle 42 such that via spindle sensor 58 and encoder 60 the position of drive pin 86 is always known and can be used to determine a positional relationship between drive spindle 42 and crankshaft 24, as described below. Spindle sensor 58 is positioned adjacent first dial plate 70 and is operable to indicate that the drive spindle 42 is at a specific position. Specifically, spindle sensor 58 indicates when drive spindle 42 is at a specific angular position as drive spindle 42 rotates about spindle axis 46. There is a pulley 90 positioned on drive spindle 42 adjacent first end 66. Pulley 90 is configured to engage with drive belt 50 so that drive spindle 42 can be rotated by motor 54. Encoder 60 is mounted to the shaft of motor 54 so that the motor 54 and encoder 60 rotate together.

The preceding description of balancing machine 22 is that of a typical balancing machine that is known in the art. Accordingly, further descriptions of balancing machine 22 and the use of a drive spindle 42 having a mechanical couple to balance crankshaft 24 is not described in detail.

Crankshaft 24 has opposite first and second ends 100 and 104. A plurality of crankpins 108, 110, 112, and 114 are positioned on crankshaft 24 between first and second ends 100 and 104. Each crankpin 108, 110, 112 and, 114 has a respective centerline 116, 118, 120, and 122 that are each offset from a central crankshaft axis 130. The positions of crankpins 108, 110, 112, and 114 relative to one another are known to a very high tolerance such that deviations between the actual and nominal positions of crankpins 108, 110, 112, and 114 relative to one another is inconsequential to the balancing of crankshaft 24. Crankpins 108, 110, 112, and 114 serve as attachment locations or connection points for the connection of other components possessing mass, such as connecting rods and pistons, to crankshaft 24.

Figure 3:
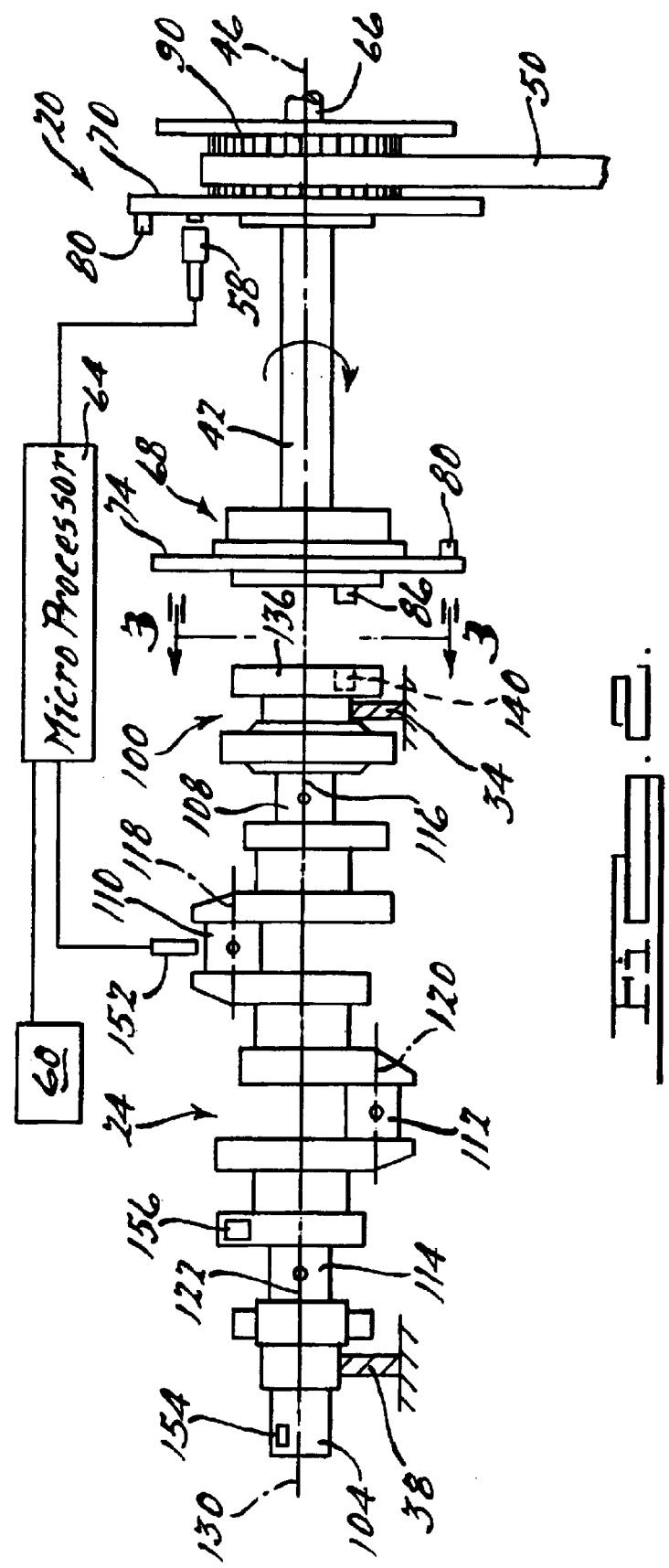
FIG. 3 is an end view of the crankshaft of FIG. 2 along line 3—3 showing the potential deviations in the position of the drive location.

First end 100 of crankshaft 24 has a flange 136 with a drive hole 140, which may be a manufacturing hole. Drive hole 140 has a drive location 144, which is the location where drive pin 86 contacts the inner surface of drive hole 140. In an ideal or perfect crankshaft, the position of drive location 144 on flange 136 relative to the positions of crankpins 108, 110, 112, and 114 is at a known relationship. That is, the angular position of drive location 144 of drive hole 140 relative to the position of centerlines 116, 118, 120, and 122 of respective crankpins 108, 110, 112, and 114 is a known relationship. However, during the manufacturing of crankshafts the actual location, size and/or shape of drive hole 140 will vary such that drive location 144 within the drive hole 140 will vary from the ideal or nominal position of drive location 144. That is, as can be seen in FIG. 3 and represented by the dashed outline of drive hole 140, the actual position of drive location 144 of drive hole 140 can have an angular deviation α from the ideal or nominal position of drive location 144 of drive hole 140. The angular deviation α is taken into consideration by compensation system 20 when balancing crankshaft 24, as described below.

With the positions of centerlines 116, 118, 120, and 122 of crankpins 108, 110, 112, and 114 relative to one another being known, a positional relationship between drive location 144 of drive hole 140 and any one of the centerlines 116, 118, 120, and 122 yields a relationship between drive location 144 of drive hole 140 and centerlines 116, 118, 120, and 122 of all the crankpins 108, 110, 112, and 114. Thus, if the actual position of drive location 144 relative to crankpins 108, 110, 112, and 114 is determined, drive location 144 can be used as a reference point on crankshaft 24 from which positions of crankpins 108, 110, 112, and 114 can be determined and proper balancing of crankshaft 24 performed.

When being balanced, crankshaft 24 is positioned on balancing machine 22 with first and second ends 100 and 104 positioned on respective supports 34 and 38. Crankshaft 24 is coupled to and aligned with drive spindle 42 by engaging drive pin 86 on drive spindle 42 with drive hole 140 on crankshaft 24 which aligns crankshaft axis 130 with spindle axis 46. The engagement between drive pin 86 and drive location 144 within drive hole 140 provides a known positional relationship between drive location 144 and drive spindle 42 such that this positional relationship can be used in the balancing of crankshaft 24. Specifically, since drive pin 86 is at a known position relative to drive spindle 42 engagement between drive pin 86 and drive location 144 provides an angular relationship between drive spindle 42 and drive location 144.

This angular relationship between drive spindle 42 and drive location 144 can be converted to an angular relationship between drive spindle 42 and crankpins 108, 110, 112, and 114 due to the positional relationship between drive location 144 and crankpins 108, 110, 112, and 114 described above. However, due to angular deviation α between the actual and nominal position of drive location 144, the angular relationship between drive spindle 42 and crankpins 108, 110, 112, and 114 will also experience angular deviation α. In other words, angular deviation α between drive location 144 and crankpins 108, 110,112, and 114 is translated into a same angular deviation α between drive spindle 42 and crankpins 108,110,112, and 114.

When balancing crankshaft 24, the ideal or nominal angular relationship between drive spindle 42 and crankpins 108, 110, 112, and 114 is used, as described below. However, as stated above, the angular relationship between drive spindle 42 and crankpins 108, 110, 112, and 114 includes angular deviation α such that balancing crankshaft 24 to within the required tolerances may not be possible without compensating for angular deviation α. To compensate for angular deviation α, compensation system 20 includes a crankpin sensor 152 that is connected to microprocessor 64. Crankpin sensor 152 is operable to sense one of the crankpins when it passes crankpin sensor 152. That is, crankpin sensor 152 is capable of triggering a signal to microprocessor 64 when a crankpin being sensed passes crankpin sensor 152. Microprocessor 64 can then determine an angular relationship between the crankpin being sensed by crankpin sensor 152 and drive spindle 42 as sensed by spindle sensor 58 based on position information from encoder 60. This angular relationship determined by microprocessor 64 includes angular deviation α and is compensated for in the balancing of crankshaft 24, as described below.

Crankpin sensor 152, as stated above, is operable to sense when one of the crankpins 108, 110, 112, and 114 passes by. Crankpin sensor 152 is positioned adjacent one of the crankpins that is desired to be sensed. When crankshaft 24 is rotated about central axis 130, the crankpin being sensed will periodically pass by crankpin sensor 152 thus causing crankpin sensor 152 to send a signal to microprocessor 64 indicating the position of the specific crankpin being sensed at that time. Crankpin sensor 152 can take a variety of forms. For example, crankpin sensor 152 can be a non-contact magnetic sensing sensor that is capable of detecting when a leading edge and a trailing edge of the crankpin come into and leave the range of the magnetic sensor. When the crankpin comes into and leaves the proximity of crankpin sensor 152, a very sharp and repeatable event occurs which is symmetrical each time the crankpin passes by crankpin sensor 152. These two indicators are then used to provide a location of the center of the crankpin at a particular moment in time. Thus, crankpin sensor 152 is operable to signal to microprocessor 64 when the crankpin being sensed is at a specific location. Microprocessor 64 can then use the information from crankpin sensor 152 in conjunction with the information from spindle sensor 58 and encoder 60 to provide an angular relationship between drive spindle 42 and the crankpin being sensed by crankpin sensor 152. It should be appreciated, that other types of sensors that are operable to signal the position of a crankpin, can be employed without departing from the scope of the present invention.

Thus, microprocessor 64 can determine an actual angular relationship between drive spindle 42 and crankpins 108, 110, 112, and 114 that differs from a nominal angular relationship by angular deviation α. To determine angular deviation α, so that it can be compensated for in the balancing of crankshaft 24, a calibration standard (i.e., an ideal crankshaft) is used to calibrate compensation system 20. Specifically, a calibration standard is attached to balancing machine 22 and microprocessor 64 determines a nominal angular relationship between drive spindle 42 and one of the crankpins of the calibration standard that is sensed by crankpin sensor 152. Since the positions of each crankpin relative to one another are known, this nominal angular relationship can be converted into a nominal angular relationship for any of the crankpins. This nominal angular position can then be stored and used as a comparison when an actual angular relationship between drive spindle 42 and crankpins 108, 110, 112, and 114 of a crankshaft 24 being balanced is determined. The comparison then yields the angular deviation α which can be compensated for when balancing crankshaft 24, as described below.

Figure 4:
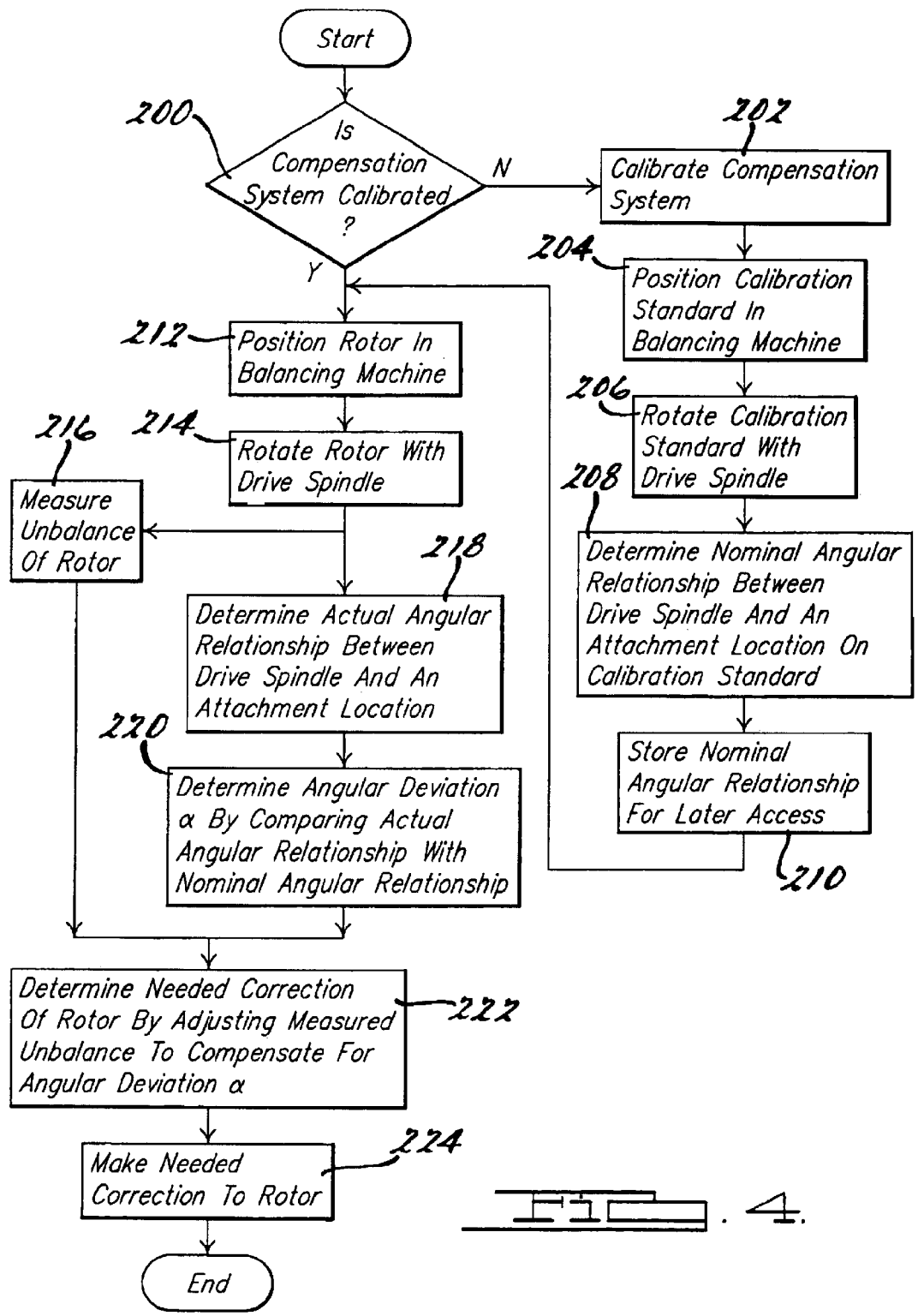
FIG. 4 is a flow chart illustrating the steps in compensating for deviations in the position of the drive location.

Referring now to FIG. 4, the method of using compensation system 20 to compensate for angular deviation α in a crankshaft 24 is illustrated. Before using compensation system 20 to balance crankshaft 24, it must be determined if compensation system 20 has been calibrated, as indicated in block 200. If compensation system 20 has not been calibrated, a calibration of compensation system 20 is performed, as indicated in block 202.

Compensation system 20 is calibrated by positioning a calibration standard in balancing machine 22, as indicated in block 204. The calibration standard is an ideal or nominal crankshaft that has drive location 144 of drive hole 140 positioned in an ideal or nominal relationship relative to centerlines 116, 118, 120, and 122 of crankpins 108, 110, 112, and 114. The calibration standard is positioned in balancing machine 22 so that drive hole 140 is engaged with drive pin 86 of drive spindle 42. Balancing machine 22 is then operated to rotate drive spindle 42 which rotates the calibration standard by means of drive pin 86 pushing the calibration standard at the drive location 144, as indicated in block 206. With the calibration standard rotating, microprocessor 64 detects when a crankpin on the calibration standard being detected by crankpin sensor 152 passes crankpin sensor 152. Microprocessor 64 also knows the angular position of drive spindle 42 via spindle sensor 58 and encoder 60 at the time when crankpin sensor 152 indicates that the crankpin being measured is passing crankpin sensor 152. Microprocessor 64 then uses this information to determine a nominal angular relationship between drive spindle 42 and the crankpin on the calibration standard being measured, as indicated in block 208. The microprocessor 64 can then use this nominal angular relationship to determine a nominal angular relationship between drive spindle 42 and the other crankpins based on the known relationship between the crankpins. The nominal angular relationship is then stored for later access by microprocessor 64, as indicated in block 210. With the nominal angular relationship having been determined and stored, compensation system 20 is now calibrated and ready to balance crankshaft 24.

To balance crankshaft 24, crankshaft 24 is positioned in balancing machine 22, as indicated in block 212. Crankshaft 24 is positioned so that it is engaged with drive spindle 42 and drive pin 86 is engaged in drive hole 140. Balancing machine 22 is then operated to cause drive spindle 42 to rotate which in turn rotates crankshaft 24, as indicated in block 214. With crankshaft 24 rotating in balancing machine 22, the unbalance of crankshaft 24 can be measured and/or the angular deviation α can be determined. The balancing of crankshaft 24 and the determination of angular deviation α can be performed simultaneously or consecutively, depending upon the desired operation of compensation system 20. Preferably, the measuring of the unbalance of crankshaft 24 and the determination of angular deviation α are performed simultaneously, as shown in FIG. 4. Thus, with crankshaft 24 being rotated in balancing machine 22 by drive spindle 42, the unbalance of crankshaft 24 can be measured as indicated in block 216. The measuring of the unbalance of crankshaft 24 is known in the art and, therefore, is not described in further detail.

Simultaneously with the measuring of the unbalance of crankshaft 24, the actual angular relationship between drive spindle 42 and one of the crankpins 108, 110, 112, and 114 of crankshaft 24 is determined, as indicated in block 218. Preferably, the same crankpin as was measured on the calibration standard is used to determine the actual angular relationship between drive spindle 42 and the crankpins of crankshaft 24. Specifically, crankpin sensor 152 senses when the crankpin being measured passes by crankpin sensor 152. This information is relayed to microprocessor 64. Microprocessor 64 also knows the angular position of drive spindle 42 via spindle sensor 58 and encoder 60. Microprocessor 64 can then determine the actual angular relationship between drive spindle 42 and the crankpin being measured by crankpin sensor 152. It should be appreciated, however, that a different crankpin on crankshaft 24 can be used without departing from the scope of the present invention.

Once the actual angular relationship has been determined, the angular deviation α can be determined by comparing the actual angular relationship with the nominal angular relationship determined during the calibration step, as indicated in block 220. Specifically, microprocessor 64 accesses the nominal angular relationship that was determined during the calibration standard and compares it with the actual relationship determined in block 218. The difference between these angular relationships is angular deviation α. Thus, angular deviation α represents a deviation in the angular relationship between drive spindle 42 and the crankpin on crankshaft 24 being measured which is the same as determining the angular deviation α between drive location 144 and the crankpin on crankshaft 24 being measured. That is, because the relationship between drive location 144 and drive spindle 42 is fixed by the engagement of drive pin 86 in drive hole 140 while the crankshaft 24 is rotating, the determination of an angular deviation α between drive spindle 42 and the crankpin being measured is the same as determining the angular deviation between drive location 144 and the crankpin being measured.

With the angular deviation α determined in block 220 and the unbalance of crankshaft 24 measured in block 216, the necessary correction to crankshaft 24 to achieve a desired balance is determined, as indicated in block 222. Specifically, the needed correction of crankshaft 24 is determined by adjusting the measured unbalance to compensate for angular deviation α. To compensate for angular deviation α, the raw unbalance of crankshaft 24 measured in block 216 can be adjusted by the vector addition of the raw unbalance measured in block 216 to the vector difference between the nominal mechanical compensation value and the actual mechanical compensation value. The actual mechanical compensation value is computed by adding the angular deviation α to the angle of the nominal mechanical compensation. Alternatively, the measured unbalance of crankshaft 24, as determined in block 216, can be translated into a required correction and the required correction can then be adjusted to compensate for angular deviation α. The methods for any variety of compensation methods are well known in the art as they are essentially the same as various compensations that occur within a typical electronic balancing system.

With the necessary corrections determined in block 222, corrections to crankshaft 24 can then be made, as indicated in block 224. Specifically, based on the corrections determined in block 222, mass can be removed from crankshaft 24, as is known in the art, to reduce the unbalance of crankshaft 24 to a desired level.

Thus, the present invention provides a compensation system 20 that compensates for positional variations in drive location 144 in crankshaft 24. These positional variations are taken into account when balancing crankshaft 24 so that proper balancing of crankshaft 24 can be achieved and the required tolerances met. The present invention also compensates for wear in the drive pin 86 or other drive tooling on drive spindle 42 that develops in between each time a calibration procedure is performed. It should be appreciated that due to the high level of accuracy in the relative positions between the crankpins, that only one of the crankpins of crankshaft 34 needs to be monitored and that the choice of which crankpin to monitor is arbitrary. Additionally, while crankpin sensor 152 is shown as being a magnetic pickup sensor, other types of sensors that are capable of signaling when a crankpin is in a specific position can be employed without departing from the scope of the invention.

It should be appreciated that while compensation system 20 and the methods of using compensation system 20 disclosed herein are explained with reference to a crankshaft type of rotor 24, the present invention is applicable to other types of rotors 24. Additionally, it should be appreciated that drive location 144 does not need to be within a drive hole 140 on rotor 24 to be within the scope of the present invention. Rather, drive location 144 can be any location or point on rotor 24 that is used to drive rotation of rotor 24 during a balancing operation. For example, drive location 144 can be on a keyway or key 156 on rotor 24 or on a mill pad or notch 158 on rotor 24. Accordingly, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of balancing a rotor in a balancing machine, the rotor having a drive location and at least one attachment location to which component(s) possessing mass are later attached, the method comprising:
   (a) determining a deviation in a relationship between the drive location on the rotor and the attachment location on the rotor while the rotor is rotating in the balancing machine; and
   (b) compensating for said deviation while balancing the rotor in the balancing machine.

2. The method of claim 1, wherein step (a) includes determining an angular deviation in an angular relationship between the drive location and the attachment location.

3. The method of claim 1, wherein the rotor is a crankshaft that has a central axis, the attachment location is a crankpin, and the drive location is a drive hole and further comprising rotating said crankshaft about said central axis with said drive hole.

4. The method of claim 1, wherein the rotor is a crankshaft that has a central axis, the attachment location is a crankpin, and the drive location is a mill pad and further comprising rotating said crankshaft about said central axis with said mill pad.

5. The method of claim 1, wherein the rotor is a crankshaft that has a central axis, the attachment location is a crankpin, and the drive location is a keyway and further comprising rotating said crankshaft about said central axis with said keyway.

6. The method of claim 1, wherein step (a) includes determining a positional deviation in a positional relationship between the drive location and the attachment location.

7. The method of claim 1, wherein step (a) includes:
   determining a nominal relationship between a drive location on a calibration standard and an attachment location on said calibration standard;
   determining an actual relationship between the drive location on the rotor and the attachment location on the rotor; and
   wherein said deviation is a difference between said nominal relationship and said actual relationship.

8. A method of balancing a crankshaft in a balancing machine, the crankshaft having a drive hole which can be used to rotate the crankshaft during a balancing operation, the method comprising:
   (a) determining a deviation in a relationship between the drive hole on the crankshaft and a crankpin on the crankshaft while the crankshaft is rotating in the balancing machine; and
   (b) compensating for said deviation while balancing the crankshaft in the balancing machine.

9. The method of claim 8, further comprising rotating the crankshaft with the drive hole.

10. The method of claim 8, wherein step (a) includes determining an angular deviation in an angular relationship between the drive hole and said crankpin.

11. The method of claim 8, wherein step (a) includes determining a positional deviation in a positional relationship between the drive hole and said crankpin.

12. The method of claim 8, wherein step (a) includes sensing a leading edge of said crankpin and sensing a trailing edge of said crankpin.

13. The method of claim 8, wherein step (a) includes:
   determining a nominal relationship between a drive hole on a calibration standard and a crankpin on said calibration standard;
   determining an actual relationship between the drive hole on the crankshaft and said crankpin on the crankshaft; and
   wherein said deviation is a difference between said nominal relationship and said actual relationship.

14. A system for balancing a rotor having a drive location and at least one attachment location to which component(s) possessing mass are later attached, the system comprising:
   a balancing machine operable to balance the rotor, said balancing machine including a spindle operable to couple to the drive location on the rotor being balanced, said spindle rotating the rotor during balancing;
   an attachment location sensor operable to sense a position of the attachment location on the rotor being balanced; and
   wherein a deviation between a nominal position of the drive location and an actual position of the drive location relative to the attachment location being sensed is compensated for during balancing of the rotor.

15. The system of claim 14, wherein said deviation is an angular deviation.

16. The system of claim 14, wherein said attachment location sensor is a magnetic sensor.

17. The system of claim 14, wherein said attachment location sensor senses a leading edge of the attachment location and a trailing edge of the attachment location.

18. The system of claim 14, wherein said attachment location sensor senses said position of the attachment location while the rotor is being rotated by said spindle.

19. The system of claim 14, wherein the rotor is a crankshaft, the attachment location is a crankpin on said crankshaft, and the drive location is a drive hole on said crankshaft.

20. The system of claim 14, wherein said spindle has a drive pin that engages with said drive hole on the crankshaft, said drive pin aligning said drive hole relative to said spindle.

21. The system of claim 14, wherein the rotor is a crankshaft, the attachment location is a crankpin on said crankshaft, and the drive location is a mill pad on said crankshaft.

22. The system of claim 14, wherein the rotor is a crankshaft, the attachment location is a crankpin on said crankshaft, and the drive location is a keyway on said crankshaft.

23. The system of claim 14, wherein said balancing machine further includes:
   a spindle sensor operable to provide a signal when said spindle is at a fixed point in said spindle's rotation; and
   an encoder operable to provide spindle position information as said spindle rotates.

* * * * *